(12) United States Patent
Conway et al.

(10) Patent No.: US 10,366,620 B2
(45) Date of Patent: Jul. 30, 2019

(54) LINGUISTIC ANALYSIS OF STORED ELECTRONIC COMMUNICATIONS

(71) Applicant: MATTERSIGHT CORPORATION, Chicago, IL (US)

(72) Inventors: Kelly Conway, Lake Bluff, IL (US); Christopher Danson, Austin, TX (US); Melissa Moore, Chicago, IL (US); Jason Wesbecher, Austin, TX (US)

(73) Assignee: MATTERSIGHT CORPORATION, Chicago, IL (US)

( * ) Notice: Subject to any disclaimer, the term of this patent is extended or adjusted under 35 U.S.C. 154(b) by 32 days.

(21) Appl. No.: 15/260,725

(22) Filed: Sep. 9, 2016

(65) Prior Publication Data

US 2018/0075775 A1 Mar. 15, 2018

(51) Int. Cl.
| | |
|---|---|
| *G09B 5/12* | (2006.01) |
| *G09B 7/00* | (2006.01) |
| *G10L 25/51* | (2013.01) |
| *H04L 29/08* | (2006.01) |
| *G09B 19/04* | (2006.01) |

(52) U.S. Cl.
CPC ............... *G09B 5/12* (2013.01); *G09B 7/00* (2013.01); *G09B 19/04* (2013.01); *G10L 25/51* (2013.01); *H04L 67/306* (2013.01)

(58) Field of Classification Search
CPC ................................. G09B 19/04; G10L 25/51
USPC ......................................................... 434/185
See application file for complete search history.

(56) References Cited

U.S. PATENT DOCUMENTS

| | | | |
|---|---|---|---|
| 8,718,262 B2 | 5/2014 | Conway et al. | |
| 8,788,307 B2 | 7/2014 | Wright et al. | |
| 8,843,362 B2 | 9/2014 | Danielson | |
| 9,026,541 B2 | 5/2015 | Mahmud et al. | |
| 9,083,801 B2 | 7/2015 | Conway et al. | |
| 9,116,877 B2 | 8/2015 | Chandramouli et al. | |
| 2009/0103711 A1* | 4/2009 | Conway | H04M 3/5175 379/266.01 |
| 2010/0223341 A1 | 9/2010 | Manolescu et al. | |
| 2011/0144971 A1* | 6/2011 | Danielson | G06F 3/011 704/1 |
| 2012/0284080 A1 | 11/2012 | De Oliveira et al. | |
| 2013/0238380 A1 | 9/2013 | Peterson | |
| 2013/0337909 A1* | 12/2013 | Pattison | A63F 13/60 463/29 |
| 2014/0337009 A1 | 11/2014 | Kau et al. | |
| 2014/0362984 A1* | 12/2014 | Danson | H04M 3/5175 379/265.06 |
| 2015/0100356 A1 | 4/2015 | Bessler et al. | |
| 2015/0286650 A1 | 10/2015 | Stump | |

(Continued)

OTHER PUBLICATIONS

U.S. Appl. No. 15/071,037, filed Mar. 15, 2016, Danson et al.

(Continued)

*Primary Examiner* — Thomas J Hong
(74) *Attorney, Agent, or Firm* — Haynes and Boone, LLP (57) ABSTRACT

Devices, systems, and methods are provided that receive communications from a contact and conduct linguistic analysis of the communications. A user is taught to facilitate communication with the contact, based on the linguistic analysis, which may include providing recommendations based on personality types. A gamification system may be provided to teach the user about personality types.

13 Claims, 5 Drawing Sheets

(56) References Cited

U.S. PATENT DOCUMENTS

2015/0317564 A1 11/2015 Chen et al.
2016/0034831 A1 2/2016 Arroyo et al.

OTHER PUBLICATIONS

Crystal Project Inc., Press page, available at https://www.crystalknows.com/press (last accessed Feb. 10, 2016).
Mattersight Corporation, Homepage, available at http://www.mattersight.com/ (last accessed Feb. 10, 2016).
IBM, "Using the Personality Insights service," Watson Developer Cloud, available at http://www.ibm.com/smarterplanet/us/en/ibmwatson/developercloud/doc/personality-insights.html (last accessed Feb. 10, 2016).
John, Oliver D., "Big Five Inventory Model" (©2000).
Kahler, Taibi, "Process Communication Model™" (circa 1979).
Kapp, Karl M., "Eight Game Elements to Make Learning More Intriguing;" Association for Talent Development, Mar. 12, 2014, available at https://www.td.org/Publications/Blogs/Learning-Technologies-Blog/2014/03/Eight-Game-Elements-to-Make-Learning-More-Intriguing (last accessed Jun. 20, 2016).

* cited by examiner

LINGUISTIC ANALYSIS OF STORED ELECTRONIC COMMUNICATIONS

TECHNICAL FIELD

The present disclosure generally relates to methods, apparatus, and systems that conduct linguistic analysis of electronic communications received from a contact. A user is taught to facilitate communication with the contact, based on the linguistic analysis, which may include providing recommendations based on personality types. A gamification system may be provided to teach the user about personality types.

BACKGROUND OF THE DISCLOSURE

Effective communication between people is a key aspect of both business and personal relationships. In recent years, the types and quantity of communications that most people engage in every day has grown substantially. In efforts to keep up with the amount of necessary communication in their lives, people often overlook the time-honored principles of mutual understanding that can improve the effectiveness of communications. The flood of modern communications has exacerbated this problem by including forms of communication that are increasingly brief and abstract. However, the application of social science, and in particular classifying and understanding personality types, may help communicators understand each other better. Some conventional communication improvement systems collect and analyze surveys from communicators in an effort to classify them according to demographic information or other characterization methods to improve communications. However, these conventional systems are generally limited in their scope because they require manual analysis of personality or a self-survey or personality Another problem with conventional communication improvement systems is that they assume that a communicator will apply survey results in an effective way, while some people do not know how to adequately apply these results to improve their communications. Furthermore, conventional communication improvement systems may be difficult or tedious to use, which may decrease the effectiveness of the systems.

Accordingly, improved devices, systems, and methods are needed and are disclosed herein that provide a linguistic-based analysis of communications that may provide a personality type analysis of a contact, and provide communication recommendations to a user based on the analysis.

SUMMARY

The present disclosure describes methods for teaching a user to facilitate communications. The methods may include receiving, by a processor, a plurality of electronic communications from a contact; conducting, by a processor, a linguistic analysis of the plurality of electronic communications; teaching the user to facilitate communication with the contact, wherein the teaching includes providing communication recommendations specific to a proposed communication by the user to the contact, wherein the communication recommendations are based on the linguistic analysis.

In some embodiments, providing the communication recommendations may further include identifying a personality type of the contact. The method may also include generating a personality profile of the user. Providing the communication recommendations may further include providing an overview of a plurality of personality types.

In some embodiments, the electronic communications are one or more phone calls, emails, text messages, social media posts, video interactions, facsimile transmissions, web interactions, chats, voice over IP. The user may be a contact center agent. In some embodiments, teaching the user to facilitate communication with the contact further includes providing a game or quiz based on personality type recognition.

A method of teaching a user to facilitate communications is also described, which may include: receiving, by a processor, a plurality of electronic communications from a contact; conducting, by a processor, a linguistic analysis of the plurality of electronic communications; providing personality type criteria for a plurality of personality types; and teaching the user to facilitate communication with the contact, wherein the teaching includes providing communication recommendations specific to a proposed communication by the user to the contact, wherein the communication recommendations are based on the linguistic analysis and the personality type criteria.

In some embodiments, the method includes generating a personality profile of the user. The linguistic analysis may include identifying a plurality of phrases associated with each of the plurality of personality types. Providing the communication recommendations may further include providing the user an overview of the plurality of personality types.

In some embodiments, the electronic communications are one or more phone calls, emails, text messages, social media posts, video interactions, facsimile transmissions, web interactions, chats, voice over IP. The user may be a contact center agent. In some embodiments, teaching the user to facilitate communication with the contact further includes providing a game or quiz based on personality type recognition.

A personality-type gamification system is also described, which may include: a communications link configured to receive one or more communications; an analysis processor in bi-directional communication with the communications link, wherein the analysis processor includes a plurality of non-transitory computer readable instructions stored in association therewith that are accessible to, and executable by, the processor, wherein the plurality of instructions, when executed: receive the one or more communications from the communications link; analyze the one or more communications to identify personality types associated with the one or more communications; provide an overview of one or more personality types to a user; and provide one or more games or quizzes to the user and instructions to take the one or more games or quizzes to test the user's knowledge of the plurality of personality types provided; and a display device configured to display to the user at least a performance analysis for the user.

In some embodiments, the gamification system of claim 15, wherein the plurality of instructions, when executed, further determine the performance analysis based on the performance of the user taking one or more additional games or quizzes directed to personality types. The user may be a contact center agent.

In some embodiments, the plurality of instructions, when executed, further generate one or more recommendations based on facilitating communications with others based on the plurality of personality types. The plurality of instructions, when executed, may further provide a feedback prompt to gather feedback information from the user based on the accuracy of the one or more recommendations. The plurality of instructions, when executed, may further provide using the feedback information to generate the one or more recommendations.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

The present disclosure describes device, systems, and methods that receive and analyze communications from a contact. A user is taught how to facilitate communication with the contact based on the analysis. A gamification system may be provided to teach the user about personality types.

DETAILED DESCRIPTION

The present disclosure advantageously describes devices, systems, and methods that analyze communications and generate recommendations to improve communication between a user and a contact. In particular, the present disclosure may identify personality type of a contact to generate communication recommendations based on the personality type of a contact. In a preferred embodiment, a user may interact with a series of games configured to teach the user about personality types and identify communication techniques favored and disfavored by that personality type.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not necessarily be described separately.

Figure 1:
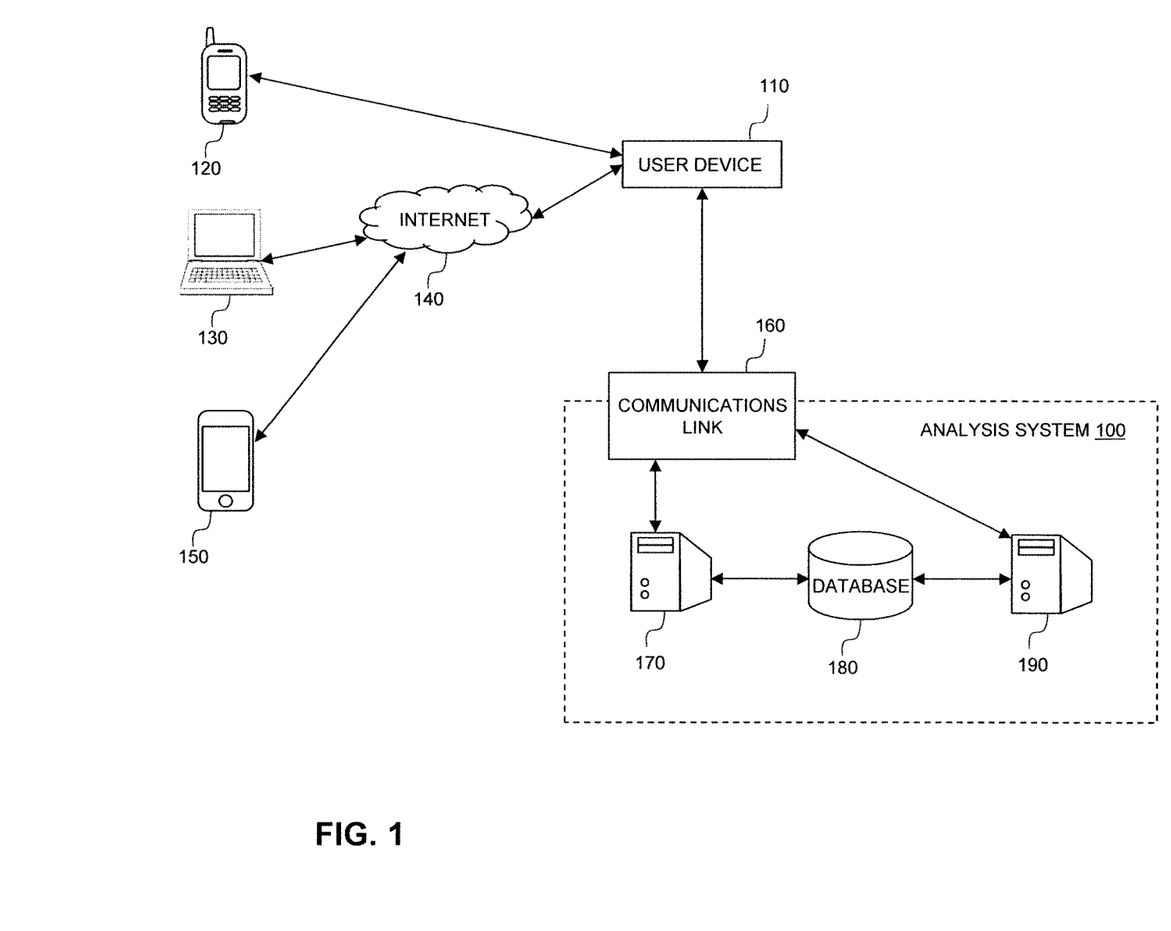
FIG. 1 is a block diagram of an embodiment of an analysis system for receiving and analyzing communications according to various aspects of the present disclosure.

FIG. 1 is a simplified block diagram of an embodiment of an analysis system 100 according to various aspects of the present disclosure. An analysis system 100 as described here may communicate with a user device 110. A user device 110 may be any device used to receive communications. In some embodiments, the user device 110 is a computer, tablet, telephone, e-reader, or other internet-capable device such as via cellular, Wi-Fi, or other suitable communication linkage. The communications received by the user device 110 can include communications on the internet, communications from customers to one or more businesses, educational communications, personal communications, and communications between employees. The communications may also represent a variety of data sources. For example, data sources may include telephone calls, video interactions, facsimile transmissions, e-mails, web interactions, text messages, chat messages, and voice over IP ("VoIP"). These communications may occur on public switched telephone network (PSTN) or the Internet, e.g., including via Skype®, Facetime®, Tango™, or any other communication app, program, website, or other software or hardware. Various specific types of communications contemplated through one or more of these channels include, without limitation, voice, email, SMS data (e.g., text), tweet, instant message, webform submission, smartphone app, social media data, and web content data (including but not limited to internet survey data, blog data, microblog data, discussion forum data, and chat data), or any form of written electronic communication, etc. In some embodiments, the communications can include customer tasks, such as taking an order, making a sale, responding to a complaint, etc. In a set of preferred embodiment, the communications include data sources originally prepared as written documents involving human writing beyond rote form completion, such as emails, facsimiles, letters, word-processed documents, texts, tweets, and the like, and any combination thereof. It is contemplated that any of these data sources may be transmitted by and through any type of telecommunication device and over any medium suitable for carrying such data. For example, the data sources may be transmitted by or through telephone lines, cable, or wireless communications (e.g., satellite, Wi-Fi, Bluetooth, cellular phone network, etc.).

In some embodiments (not shown), the communication can be answers to a questionnaire or series of questions that a user answers about their own personality type, that contacts answer about their personality type and that are provided to a user, or both. The answers to the questionnaire may then be used to generate a gamification system that may be used as a training tool for the user. Various personality type models may be used, including the Big Five inventory model (©2000) by psychologist Oliver D. John, Ph.D and the Process Communication Model™ developed by Dr. Taibi Kahler. Personality type may also be determined by any other available technique available to those of ordinary skill in the art, including retrieval from a database, separately or in connection with a questionnaire.

Furthermore, the user device 110 may be configured to receive communications from a variety of devices. For example, the analysis system 100 may collect data from telephones and cellular (i.e. mobile) phones 120, fax machines, computers 130, or personal computing devices 150, as well as directly scraping information from one or more websites or other information on the internet 140. Further, the user device 110 may accept internet-based interaction sessions from computers 130, VoIP telephones, and personal computing devices 150 such as internet-enabled smartphones and tablets, and personal digital assistants (PDAs). These data sources generally include voice and non-voice data.

In some embodiments, the user device 110 is operated by a call center agent. In this case, the analysis system 100 may be included as part of the call center (or it may be part of an analysis center that provides recommendations to the call center). In particular, the agent may route communications received on the user device 110 to the analysis system 100 for the purpose of receiving recommendations for responding to the communication. In other embodiments, the user device 110 is configured to receive communications relating to personal or educational matters for an individual.

In some embodiments, the user device 110 sends received communications to the analysis system 100. The communications may be converted to an electronic or digital format before being sent to the analysis system 100. For example, the user device 110 may receive a telephone call from a cellular phone 120. The user device 110 may send a digital recording of the telephone call to the analysis system 100 for linguistic analysis. In other embodiments, the analysis system 100 receives unconverted communications directly from the source. The analysis system 100 may then send the communications and analysis results to the user device 110.

The analysis system 100 as described herein can include any facility or system suitable for receiving, recording, and analyzing electronic communications. Furthermore, as one of ordinary skill in the art would recognize, the communication channels associated with the user device 110 and analysis system 100 illustrated in FIG. 1 are just an example, and the analysis system 100 may accept other data from other sources, through various additional and/or different devices and communication channels whether or not expressly described herein. For example, in some embodiments, internet-based interactions, video-based interactions, and/or telephone-based interactions may be routed through a customer service center, such as a call center or fulfillment center, before reaching the analysis system 100. It should be understood that such a customer service center can include stand-alone or third-party service centers or proprietary service centers (e.g., staffed with employees or consultants for a particular company, such as a computer vendor, airline, social media app, hotel chain, etc.). These interactions may also be routed simultaneously to an analysis center (not shown) associated with the analysis system 100 and the customer service center (or even directly and only to an analysis center associated with the analysis system 100, in some embodiments to be distributed to a customer service center after analysis according to the disclosure herein). In some instances, the customer service center captures interaction data relevant to the analysis system 100, and applies computer-implemented linguistic algorithms to the data to generate digital data for the analysis system 100. In other embodiments, the analysis system 100 applies such algorithms and generates digital data for analysis. Further, the customer service center may be a part of, or independent of, the analysis system 100.

Figure 2:
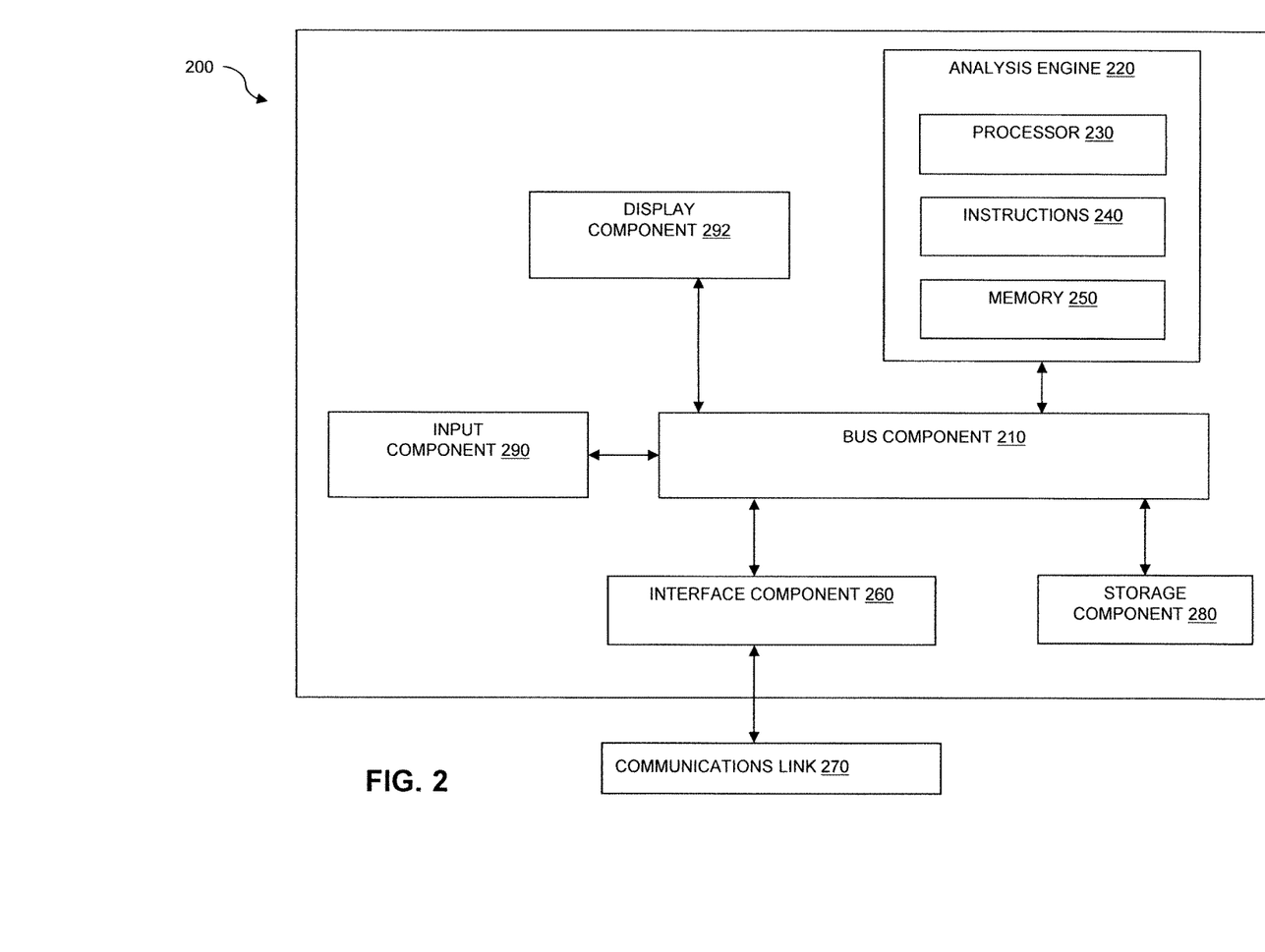
FIG. 2 is a detailed block diagram of the analysis system of FIG. 1 according to various aspects of the present disclosure.

The analysis system 100 may include a communications link 160, a conversion module 170, a database 180, and an analysis engine 190. The communications link 160 may be configured to send and receive send electronic communications. In particular, the communications link 160 may be equipped with an internet connection and/or wireless communications. The communications link 160 may send a communication received from the user device 110 to a conversion module 170. In some embodiments, the conversion module 170 is an information handling system such as a computer, server, workstation, mainframe computer, or other suitable computing device. The conversion module 170 can be a separate and distinct system, or alternatively, be an integrated component of an analysis control system 200 as shown in FIG. 2. The conversion module 170 may be configured to convert linguistic information into a text file for further handling and analysis. In some cases, the conversion module 170 is designed to convert communications with analog data, such as audio or voice data, into a digital format. In some cases, the data streams are converted into binary or text-based forms. Furthermore, the conversion of communication data may occur at the conversion module 170, or alternatively, at the analysis engine 190.

In some embodiments, the conversion module 170 transmits data to a database 180. The analysis engine 190 may access the database 180. The database 180 may be any type of reliable storage solution such as a RAID-based storage server, an array of hard disks, a storage area network of interconnected storage devices, an array of tape drives, or some other scalable storage solution located either within the contact center or remotely located (e.g., in the cloud). In the example of FIG. 1, the database 180 is an independent module within the analysis system 100. However, in some embodiments, the database 180 is an integrated component of an analysis system such as the analysis control system 200 as shown in FIG. 2. The database 180 may be populated with data from within the analysis system 100 as well as data made available by external sources such as a third party database or a data analytics center.

The analysis engine 190 may be generally configured to provide recording, voice analysis, data storage, linguistic analysis, data relationship analysis, behavioral analysis, personality type analysis, recommendation generation, and other processing functionality to the analysis system 100. In the illustrated embodiment, the analysis engine 190 is an information handling system such as a computer, server, workstation, mainframe computer, or other suitable computing device. In other embodiments, the analysis engine 190 may be a plurality of communicatively coupled computing devices coordinated to provide the above functionality for the analysis system 100. As shown in FIG. 1, the analysis engine 190 is configured to perform analysis of data streams gathered received from user device 110. This analysis includes performing software instructions on the data, applying algorithms to the data, or by sorting the data in other ways. In some embodiments, the analysis engine 190 is populated with personality type criteria and personality type attributes. This information may be used to allow the analysis engine 190 to identify one or more personality types associated with the communication received by the user device 110. The analysis engine 190 may also be configured to apply attribute information relating to each personality type to the analysis of the communication. The analysis engine 190 may also be configured to generate and display recommendations to the user to improve communication with the contact.

In some embodiments, the results of the analysis are communicated by the analysis engine 190 to the communications link 160. Furthermore, analysis data may be transmitted to the user interface 110, transmitted to another external source (such as a call center or data analytics center) via the communications link 160, stored by the analysis system 100, and/or displayed by the analysis system 100 to a user, etc. Although not shown, the analysis system 100 may include a display module for displaying analysis results. In some embodiments, the display module is included as an integrated component of the analysis engine 190.

In some embodiments, the analysis system 100 includes a lightweight Software as a Service (SaaS) application that may help call center employees enhance customer experiences by training the call center personnel to improve personality connections. Combined with predictive behavioral routing, the analysis system 100 may utilize personality analysis to improve service, sales, retention and collections interactions. An exemplary analysis system is included in U.S. patent application Ser. No. 11/731,478, filed Mar. 30, 2007, entitled "Method and System for Automatically Routing a Telephonic Communication Based on Analytic Attributes Associated with Prior Telephonic Communication," which is hereby incorporated by reference in its entirety. The analysis system 100 may integrate personality science into routing and analysis applications that may be used by a user. In particular, the analysis system 100 can include a series of game-like, personalized learning pathways. In some embodiments, the analysis system 100 may allow users learn how to identify, understand, and better connect with the various personalities of their contacts.

In particular, the analysis system 100 may include a brief personality type assessment for each user, which concludes with a customized read-out of their personality type's strengths, needs and preferences in evaluating and preparing communications. The analysis system 100 may also include a number of rich media games and quizzes, which may be designed to deepen the user's knowledge of personality types in a fun and engaging way. The user's own personality type may be among those the user learns about in some embodiments, while in other embodiments the user knows about their own personality type and learns about the other personality types. The analysis system 100 may include one or more gamification elements such as mystery, action, challenges, being at risk, uncertainty of outcome, opportunity for mastery, signs of progress, and emotional content as described in "Eight Game Elements to Make Learning More Intriguing" by Karl M. Kapp, available at https://www.t-d.org/Publications/Blogs/Learning-Technologies-Blog/2014/03/Eight-Game-Elements-to-Make-Learning-More-Intriguing (accessed Jun. 20, 2016), which is hereby incorporated by reference in its entirety. The gamification system may include any of the above, or additionally or alternatively other elements, to provide a cohesive, entertaining gaming experience for the user, including one or more techniques such as leaderboards, badges, points, contests, quizzes, notifications, and the like. The analysis system 100 may also include team analytics, leaderboards and in-app rewards to encourage engagement and reinforce key concepts. The analysis system 100 may also include dynamic email badges that help users advertise their personality types and attributes to the world. As discussed above, the users may be call center agents. In other embodiments, the users are simply employees engaged in any of a variety of ongoing businesses, such as law, medicine, engineering, business management, consulting, etc.

The analysis system 100 may provide a game-like user experience including game mechanics to deliver engagement and training of the user on personality types in a way that traditional call center applications typically do not. Users may be able to quickly build personality type acuity to better connect not only with customers, but colleagues and managers as well. The system 100 may advantageously help any type of service workers from professionals to novices more efficiently handle interactions, reduce or minimize disruption, and reduce or minimize stress with their contacts, including within their organization, other comparable organizations, customers, vendors, suppliers, other service providers, or any combination thereof.

In some embodiments, the analysis system 100 may generate a personality profile of a user or contact. The personality profile may include one or more identified personality types as well as demographic information (including professional information such as job title, job description, and history with a company) associated with the user or contact. The demographic information may, e.g., be provided by the user, or retrieved from a database associating demographic information previously obtained for a plurality of users.

FIG. 2 shows a block diagram of an analysis control system 200 according to aspects of the present disclosure. In some embodiments, the analysis control system 200 can perform some or all of the functionality ascribed to the analysis system 100 shown in FIG. 1. For example, the analysis control system 200 may record or receive telephone calls, electronic communications, internet-based communications, and/or other interactions or communications, perform data conversion and data analysis, perform other analysis center-related computing tasks, as well as combinations thereof. In particular, the analysis control system 200 may be integrated into the analysis engine 190 as a hardware or software module and share its computing resources, such as with one or more of a communications link 160 and database 180 Alternatively, the analysis control system 200 may be a separate computing system from the analysis engine 190.

The analysis control system 200 may conduct automated analysis on data streams. In particular, the analysis control system 200 can be configured to provide a linguistic analysis of one or more communications. The analysis control system 200 can include a bus component 210, an analysis engine 220, an interface component 260, a communications link 270, a storage component 280, an input component 290, and a display component 292. In some cases, the analysis engine 220 is responsible for analyzing data streams received by the analysis control system 200. The analysis engine 220 can include a processor 230 that is communicatively coupled to a memory 250, as well as a set of instructions 240.

In accordance with embodiments of the present disclosure, the analysis engine 220 performs specific operations by a processor 230 executing one or more sequences of one or more instructions 240 contained in memory 250. The processor 230 can be any custom made or commercially available processor, a central processing unit (CPU), an auxiliary processor among several processors associated with the analysis control system 200, a semiconductor-based microprocessor (in the form of a microchip or chip set), a macroprocessor, a collection of communicatively coupled processors, or any device for executing software instructions. The memory 250 provides the processor 230 with non-transitory, computer-readable storage to facilitate execution of computer instructions by the processor. Examples of memory 250 may include random access memory (RAM) devices such as dynamic RAM (DRAM), synchronous DRAM (SDRAM), solid state memory devices, and/or a variety of other memory devices known in the art.

Logic may be encoded in a computer readable medium, which may refer to any medium that participates in providing instructions 240 to processor 230 for execution. In one embodiment, the computer readable medium is non-transitory. Such a medium may take many forms, including but not limited to, non-volatile media, volatile media, and transmission media. In various implementations, volatile media includes dynamic memory, such as memory 250, and transmission media includes coaxial cables, copper wire, and fiber optics, including wires that include bus component 210. Memory 250 may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

Furthermore, instructions 240 may be read into memory 250 from another computer readable medium, such as storage component 280. These may include instructions to receive communications from a contact, conduct a linguistic analysis of the communications, identity personality type and attributes in the communications, and generate communication recommendations to a user. In other embodiments, hard-wired circuitry may be used in place of or in combination with software instructions for implementation of one or more embodiments of the disclosure.

Computer programs, instructions, and data may be stored on the storage component 280. The storage component 280 may include mass storage devices including hard discs, optical disks, magneto-optical discs, solid-state storage devices, tape drives, CD-ROM drives, and/or a variety of other mass storage devices known in the art. Further, the mass storage device may be implemented across one or more network-based storage systems, such as a storage area network (SAN).

Still referring to FIG. 2, the interface component 260 is configured to receive and transmit analysis center-related data between local and remote networked systems and communicate information via the communications link 270. In some embodiments, the communications link 270 may be the communications link 160 of FIG. 1. Examples of interface components 260 may include Ethernet cards, 802.11 WiFi devices, cellular data radios, and/or other suitable devices known or available in the art. The analysis control system 200 may further include any number of additional components, which are omitted for simplicity, such as input and/or output (I/O) devices (or peripherals), buses, dedicated graphics controllers, storage controllers, buffers (caches), and drivers. Further, functionality described in association with the analysis control system 200 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software. In some embodiments, analysis data is routed from the analysis engine 220 to an external communications distributor via the interface component 260.

The display component 292 may be configured to transmit data in a graphical format, such as on a computer monitor or a portable computing device (e.g., a cellphone, a tablet device, etc.). In some cases, analysis data from the analysis engine 220 is available to be displayed in several formats, optionally even simultaneously on the display component. For example, the display may show a chart of identified personality types in a communication along with corresponding personality traits for each of the identified personality types. Alternatively, the display component is an interface to an external display.

Figure 3:
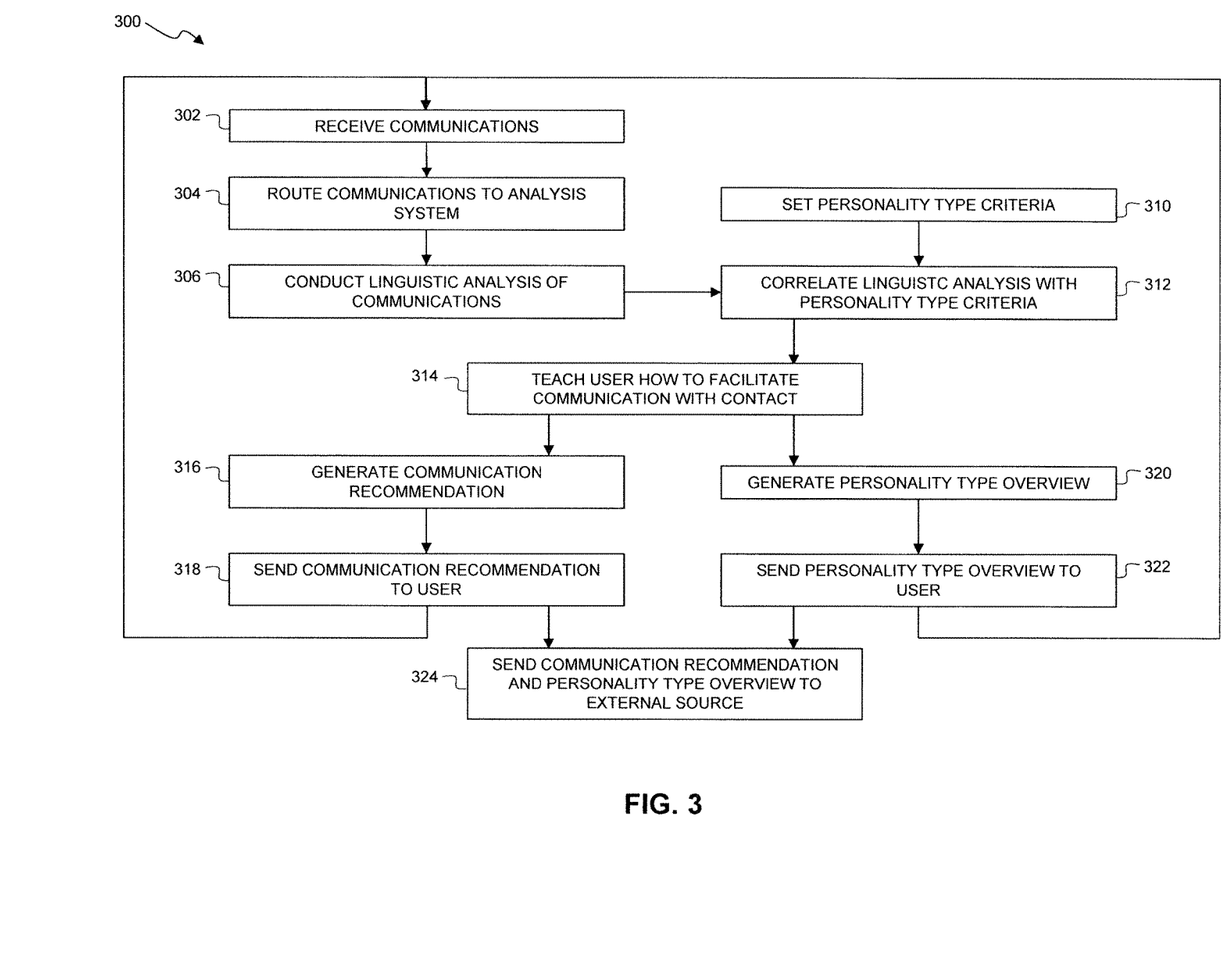
FIG. 3 is a flowchart illustrating a method of analyzing communications and generating a communication recommendation according to various aspects of the present disclosure.

An exemplary method 300 of analyzing communications according to the disclosure is described with respect to FIG. 3. Method 300 may be performed by an analysis device such as the analysis engine 100 of FIG. 1 or the analysis control system 200 of FIG. 2. At step 302, the method 300 may include receiving communications. In some embodiments, the communications are received from a user device 110 such as that depicted in FIG. 1. The communications may come from one or more contacts, which may be grouped such as by organization, by personality type (once determined), geographic region, or other organizational principle. In some embodiments, the communications come from a single contact, typically one that a user has previously communicated with or who has communicated with an organization associated with the user (e.g., the user's employer). Communications may also be received in the form of data streams. The data streams may contain both verbal and nonverbal communications, including electronic communications, video, SMS data, tweets, instant messages, web-form submissions, smartphone app data, social media data, and web content data, and telephonic communications. In particular, the data streams may contain discussion forum feeds and social media posts, such as Twitter feeds. Analog communications may be digitized before analysis. The communication may be received by an intake module or a communications link 160 such as that shown in FIG. 1.

At step 304, the method 300 may include routing the communications to an analysis system. This analysis system can include the analysis system 100 of FIG. 1 and/or the analysis control system 200 of FIG. 2. The communications analyzed during this step can include communications and data streams received by the communications link 160 of the analysis system 100. Alternatively, these communications can be received directly by an analysis engine such as the analysis engine 190 of FIG. 1 or the analysis engine 220 of FIG. 2. The communications and data streams may contain both verbal and nonverbal communications, including electronic communications and telephonic communications.

At step 306, the method 300 may include conducting a linguistic analysis of the communications. In some embodiments, an intended function of the linguistic analysis is to gather data on the characteristics, personality, and emotions of the contact. In some embodiments, the linguistic analysis may include analysis of the content of the communication, and optionally also analysis of the form of communication, including type, length, time of reply, etc. For example, analysis of the content of the communication may include identification of tone, syntax, and word choice. An analysis of the tone of the communication may include identification of personality type, as well as accompanying personality traits such as formality, optimism, transparency, confidence, organization, and distress that may be associated in varying degree with one or more of the personality types. In some embodiments, the tone of a communication may give insight into the personality type of a contact and help teach a user a suitable way to avoid conflict or more quickly gain the understanding of that contact when sending them a communications, as well as potentially indicating an emotional state of the contact. An analysis of the syntax of the communication may recognize sentence length, punctuation, and capitalization, for example. In some cases, the syntax of the communication can lend insights into the personality type, and possibly also the mood or stress level of the contact. For example, an email containing short sentences with many capitalized words and exclamation marks may signal that the contact is excited or angry, or even uncomfortable with the type of communication. Word choice may also be analyzed in the linguistic analysis. For example, a communication containing short, casual words may indicate that a contact is at ease or working quickly, while long, formal, or overly precise words may indicate that the contact considers the communication important or is feeling defensive. In some embodiments, the words of a communication may be identified by speech-recognition methods, character recognition, phonetic comparison, etc. The linguistic analysis of step 306 may include identification of partial words, phrases, and newly created words. The method 300 of the present disclosure may include one or more features described in U.S. patent application Ser. No. 15/071,037, filed Mar. 15, 2016, entitled "Trend Identification and Behavioral Analytics System and Methods", including the identification of words and terms, which is incorporated herein by express reference thereto in its entirety for techniques to identify new words and phrases that may be important to understand in the context of a business communication where limited time exists to understand, make decisions, and communicate in response.

Still referring to step 306, analysis of the form of communication itself may also lend insights to the analysis, particularly considering various factors in combination. For example, the length of an email or phone call may signify urgency or distress. The identification of a group of communications may also factor into the analysis. For example, an email that is part of an email chain containing a number of questions and answers may be better analyzed within the context of the email chain. Furthermore, a reply call that is made immediately after a first communication is sent to the contact may show that the content of the call is important. The type of communication may also affect the analysis. For example, an abrupt change in communication type (such a contact who regularly communicates via email but switches to a phone call for a recent communication) may signify urgency or distress. In some embodiments, personality type analysis includes potential reactions to stimulus, including causes of distress, for each personality type. Distress prediction and identification may lend insights how to minimize or avoid distress in an interaction, which may be more important at an early stage of communication.

The linguistic analysis of step 306 may also include the identification of "red flags." Red flags may be words or phrases that carry a special meaning or connotation. In some embodiments, this special meaning or connotation is predetermined and/or associated with the word or phrase in a database. For example, a communication may contain the sentence, "I feel strongly that we should go in a different direction." A database used during the analysis (such as database 180 in FIG. 1) may contain list of red flag phrases and words including "feel strongly," "crossed a line," "can't do" or "call immediately." Accordingly, the linguistic analysis may return a list including this red flag and related analysis to the user.

At step 310, the method 300 may include setting personality type criteria. Personality type criteria may include models that attempt to evaluate and understand natural interactions between groups of people. A variety of personality type methods may be used in the present disclosure. One example is the Big Five inventory model (©2000) by UC Berkeley psychologist Oliver D. John, Ph.D. Another is the Process Communication Model™ developed by Dr. Taibi Kahler. Exemplary personality types, which will vary from model to model and can be selected as desired for a given application or across all applications might be associate with attributes, for example: Thoughts, Opinions, Reactions, and Emotions. The personality type models generally presume that most people fall primarily into one of the enumerated basic personality types. In some cases, the models categorize each person as one or more of these four types (or some other number of personality types). In some embodiments, most people have parts of each of the types within them, albeit in varying proportions. People falling under each of the different personality types may learn differently, may be motivated differently, may communicate differently, and may have a different sequence of negative behaviors in which they engage under certain circumstances, e.g., when they are in distress. Importantly, each personality type may respond positively or negatively to communications that include tones or messages commonly associated with another of the personality types. Thus, an understanding of a user's personality type typically offers guidance as to how the user will react or respond to different situations. For example, the tone in a user's proposed communication to a contact with a certain personality type can be predicted to be better or worse received than typical based on the personality type of the contact.

In some embodiments, six personality types may be represented in the analysis system of present disclosure which may correlate with the Process Communication Model™, including the personality types of Organizer, Connector, Advisor, Doer, Dreamer, and Original. In some embodiments, the personality type criteria of step 308 may include scoring systems, lists of characteristics, and classification systems associated with a set of personality types. The personality type criteria can also contain information on attributes associated with each defined personality type. For example, the "Doer" personality type may be associated with attributes such as being charismatic, persuasive, and action-oriented. Furthermore, a person may be identified as a Doer by the language that they use, for example, using action-oriented words or phrases such as "get it done" or "seize the day." The personality type criteria may also include information about the way that people identifying with a personality type may act in certain situations. For example, a person identifying with the Doer personality type may react poorly to over-polite communication or long, drawn-out explanations. Criteria of other personality types may also be set in the system.

At step 312, the method 300 may include correlating the linguistic analysis with personality type criteria. In particular, the linguistic analysis of 306 may be correlated with the personality type criteria set in step 310, including a comparison of the content, form, and red flags identified in the communication. For example, the communication may include a short email containing the sentence, "I don't want excuses this time, please just get it done." The linguistic analysis of the email may identify the phrase "get it done," as well as the direct phrasing of the sentence. Accordingly, the analysis of the email may be correlated with the criteria of the Doer personality type. In some embodiments, the linguistic analysis of a communication may allow correlation between the communication and more than one personality type. For example, the content of an email may include phrases associated with the Doer personality type as well as a highly organized format with bullet points and statistical data, which may fall under the criteria of the Organizer personality type. The correlation of the email may therefore include comparisons to both the Doer and Organizer personality types. In some embodiments, only the personality type is considered, while in others, one or more of these other factors such as tone, content, form, length, and red flags, as well.

At step 314, the method 300 may include teaching a user how to facilitate communication with the contact. In some embodiments, step 314 may involve giving the user general information about effective communication. Step 314 may also provide analysis results of the linguistic analysis of step 306 and the correlation of step 312, or may simply provide recommendations based on the analysis results of the step 306 linguistic analysis without actually providing the analysis results. General information may include, for example, advice about using specific communication types, such as email and phone etiquette. Teaching the user in step 314 may also include giving the user specific information about the contact. For example, analysis of the communication may identify that the contact is a potential client, a former colleague, or a past supplier. Since this may affect the way in which a user responds to the communication, the step 314 may involve presenting the user with a list of company policies on contacting a potential client, former company employee, or other category of contact. Step 314 may also involve presenting the user with communication recommendations and a personality type overview which are discussed below. In some embodiments, teaching a user may involve the use of games to teach the user about personality types and attributes, and preferred techniques to communicate with people having those personality types. These games will be discussed in more detail in relation to FIGS. 4 and 5.

At step 316, method 300 may include generating a communication recommendation. In some embodiments, this step may involve applying the general information used to teach the user in step 314. For example, a communication recommendation may be generated at step 316 for a user who is responding to an email from the CEO or other officer of his or her company. The recommendation generated at step 316 may include advising the user to send a reply email within 24 hours, or preferably within 6 hours, or in other embodiments within 3 hours or less, that is short, organized, and follows company protocols for email. The communication recommendation may also include personality type information applied to the present communication. For example, the email sent by the CEO may contain language associated with the Doer personality type, for example including phrases such as "I need this soon." Accordingly, the communication recommendation generated at step 316 may include the identification of the Doer personality type as well as suggestions for responding to a contact with a Doer personality. For example, the suggestions may include responding quickly, taking responsibility, and answering questions directly.

At step 318, the communication recommendation generated in step 316 is sent to the user. In some embodiments, the communication recommendation is sent to the user electronically, such as through a computer application. In some embodiments, the communication recommendation includes a feedback function. This may allow the user to draft a communication and have it checked by the analytics system to consider if it matches a number of recommendations for a communication with that personality type. In response, the system may generate an influence score predicting the potential effectiveness of the communication. Further recommendations may be sent to the user based on the drafted communication.

At step 320, the method 300 may include generating a personality type overview. This overview may contain the personality type criteria of step 310, as well as basic information about information about how personality types may be used. In some embodiments, the overview contains a brief description each of the personality types, for example as associated attributes and examples of personality types and associated communications traits.

At step 322, the method 300 may include sending the personality type overview to the user. In some embodiments, the personality type overview is sent by a user electronically, such as through a computer application. In an exemplary embodiment within the scope of the present disclosure, the method 300 repeats after steps 322 or 318, such that method flow goes back to step 302 and begins again. The same is true of communication recommendations, that when implemented in communications can be analyzed (e.g., steps 306, 312) and provide an iterative process that evaluates communications prepared by a user after receiving the communication recommendation 318.

At step 324, the method 300 may optionally include sending the communication recommendation and personality overview to an external source. In some embodiments, this information is sent to a supervisor of the user. In other embodiments, the information is sent to a call center, data analytics center, or third party organization for further analysis.

Figure 4:
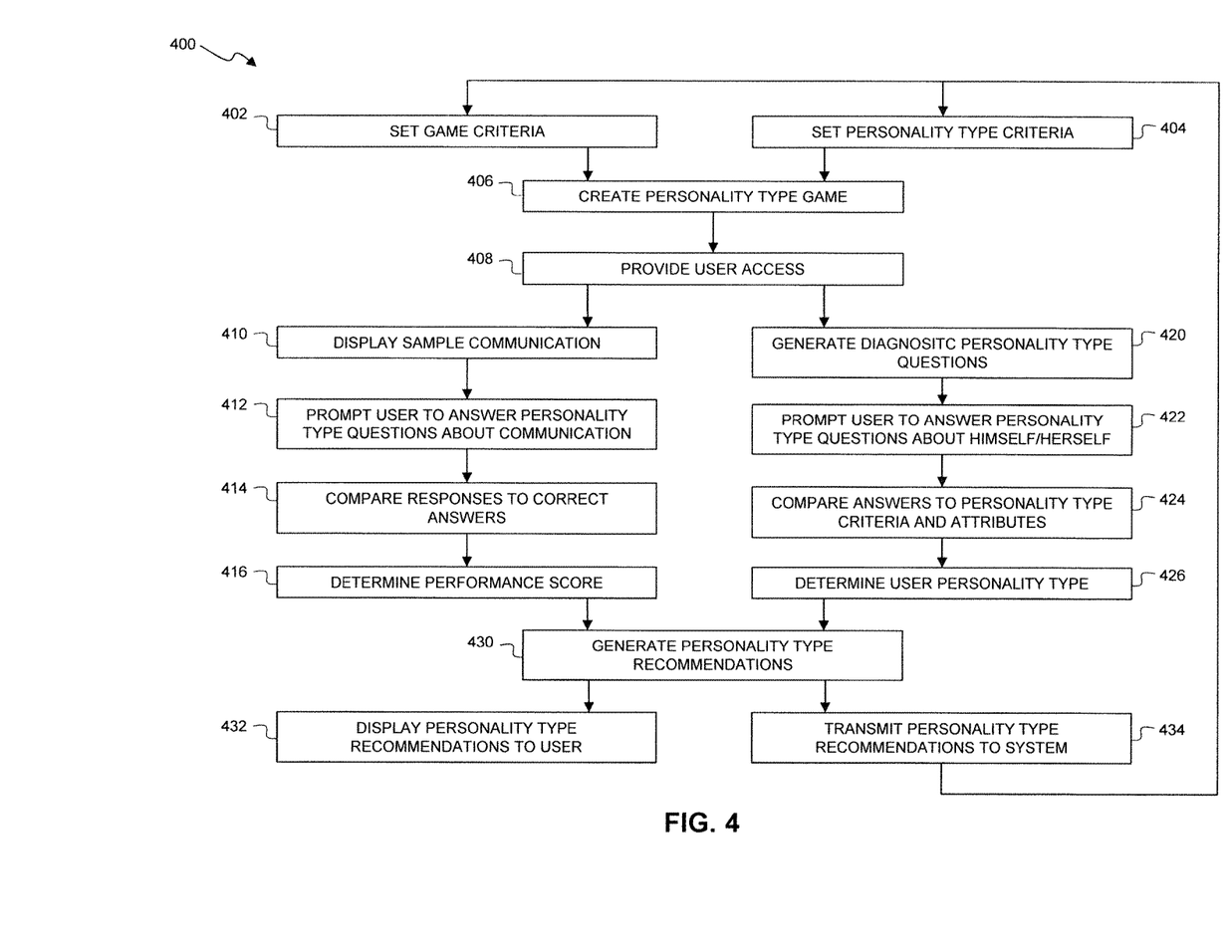
FIG. 4 is a flowchart illustrating a method of creating and administering a personality type gamification system according to various aspects of the present disclosure.

An exemplary method 400 of operating a personality type gamification system according to the disclosure is described with respect to FIG. 4. Method 400 may be performed by an analysis device such as the analysis engine 100 of FIG. 1 or the analysis control system 200 of FIG. 2. In some embodiments, a personality type gamification system may be used to educate a user on the various personality types and effective communication with each. In some embodiments, the user is a call center agent. In other embodiments, the users are employees engaged in any of a variety of ongoing businesses, such as law, medicine, engineering, business management, consulting, etc.

In this case, the gamification system may provide an enjoyable and efficient way to teach a user about personality types and their working styles with the goal of improving interaction with contacts. In other embodiments, users may use the gamification system, which teaches communication tips, skills, etc. to the user for business, personal, or educational use based on the personality type of the contact to whom the user wishes to or does correspond. In some embodiments, the gamification system is provided on an electronic system, such as on a computer. The gamification system may include interactive features that can teach about personality types, test a user's knowledge about personality types, and provide suggestions to improve communications.

Figure 5:
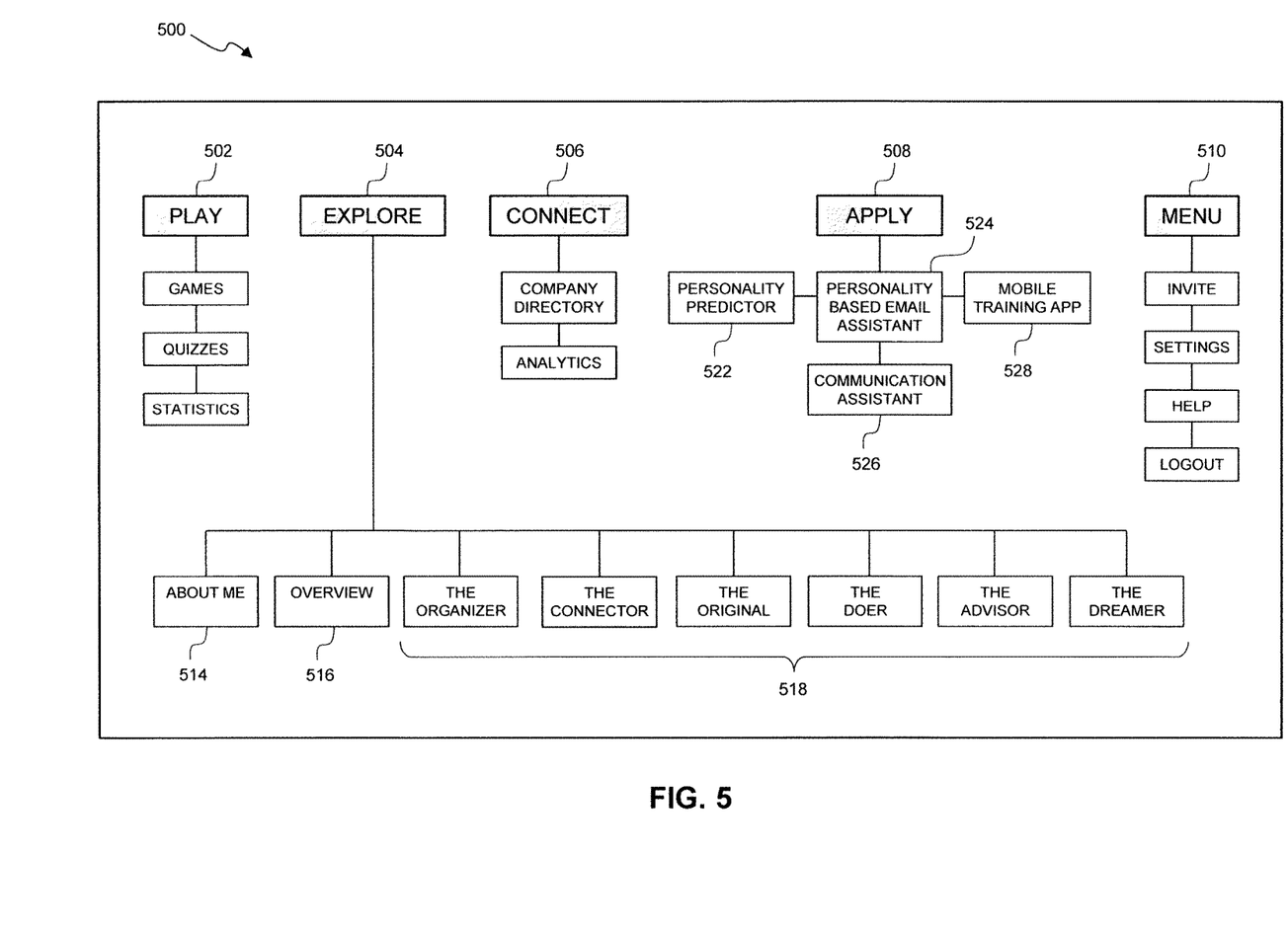
FIG. 5 is an exemplary interface of a gamification system according to various aspects of the present disclosure.

At step 402, the method 400 can include setting game criteria. In some embodiments, the game criteria can include the format, length, and type of game. In some embodiments, various games and quizzes are available on the gamification system. For example, the gamification system can include games relating to each of a set of different personality, question and answer quizzes that test a user's knowledge on personality types, problem-solving games that prompt a user to respond to situations using personality type solutions, as well as other types of games and quizzes. In some embodiments, these games and quizzes may be provided in an electronic form, such as a computer application. An interface associated with an exemplary gamification system is shown in FIG. 5.

At step 404, the method may include setting personality type criteria in the gamification system. The personality type criteria may include personality types from one or more personality type models, such as the Process Communication Model™ and either additively or alternatively, other personality type models. The personality type criteria may include personality type classification information, as well as attributes associated with the various personality types and communications tips to provide for more effective communication between the user and contacts of one or more personality types.

At step 406, the method 400 may include creating a personality type game. This game may be created using the criteria of steps 402 and 404. This game may be any of the games discussed in reference to step 402. In some embodiments, the personality type game is chosen based on the needs of a user. For example, a user may express interest in a certain personality type and would like to increase their knowledge by playing the game. Another example is a call center agent who is dealing with a number of people that fall under a personality type. In these cases, the game created for the user may contain the target personality type, or may contain all personality types to teach communication skills generally.

At step 408, the method 400 may include providing access to a user for the gamification system. In some embodiments, a user is able to log onto the system and access the games, as well as access personality type information without playing a game. A user may also be granted access to a game in response to an external input such as a received communication, or a drafted communication that is poorly worded and ignores best practices or other recommendations in communicating with that personality type. For example, a communication may be routed to a call center agent that includes content corresponding to one or more personality types. This communication may be sent to the agent along with a link to a game related to the one or more personality types. In some embodiments, the user may be presented with two functions within a gamification system. In the first function, a user answers questions to evaluate his or her knowledge of personality types. This function may be represented by steps 410, 412, 414, and 416. In the second function, a user is presented with diagnostic information to determine his or her own personality type. This may be useful in teaching the user how to communicate with contacts having the same or different personality types. The second function may be represented by steps 420, 422, 424, and 426.

At step 410, the method 400 may include displaying a sample communication. In some cases, this is a communication that has been received by a user, for example on the user device 110 depicted in FIG. 1. In some embodiments, the sample communication may have been linguistically analyzed by an analysis system. In other embodiments, the gamification system is configured to provide a linguistic analysis of the communication as well as a personality type analysis. The analysis may include generation of a set of "correct" answers associated with personality types. These correct answers may be used to evaluate a user's performance in steps 414 and 416. The sample communication may also be a previously chosen communication that highlights details about various personality types. In some embodiments, the sample communication is displayed in text form by the gamification system.

At step 412, the method 400 may include prompting a user to answer personality type questions about the communication. In some embodiments, these questions may involve identifying personality type in the content and form of the communication. For example, a user may be prompted to match phrases within the communication that are associated with various personality types.

At step 414, the method 400 may include comparing the responses to correct answers. In some embodiments, a scoring system is implemented by the gamification system that is configured to evaluate the performance of the user.

At step 416, the method 400 may include determining a performance analysis, which can include a performance score. This analysis may take into account the accuracy and difficulty of the questions of step 412. In some embodiments, the performance analysis of the user may be compared with performance analysis of others, or against a performance analysis of a group of other users (e.g., a group of users with the same personality type). For example, a gamification system may be used by a contact center to evaluate and compare the knowledge of various agents, as well as to get an overall sense of the level of knowledge of the agents. In some embodiments, the performance analysis may be quantified, or a performance score may be used, to route calls according to personality type and skill in working with certain personality types.

At step 420, the method 400 may include generating diagnostic personality type questions. These questions may be designed to help determine personality type, and optionally personality traits, of the user. The diagnostic questions may include asking about the user's preferences and asking the user what he or she would do in hypothetical situations, for example. The diagnostic questions may also prompt the user to rate himself or herself on various scales that may help to determine personality type. The user may be prompted to answer these diagnostic personality type questions in step 422.

At step 424, the method 400 may include comparing the user's answers to personality type criteria and attributes. The criteria include the personality type criteria set in step 404. At step 426, the gamification system may determine one or more personality types associated with a user. In some cases, a number of personality types and associated traits may apply to a user. The various personality types may be ranked or compared, such as on a chart or graph. In some embodiments, user may be presented with a chart of relative proportions of personality types.

At step 430, the method 400 may include generating personality type recommendations. These recommendations may be aimed toward improving communication, as well as improving understanding of the interaction between the user and the user's contact(s). In some embodiments, the recommendations may include a series of tips and suggestions. In particular, the recommendations may include specific advice for initiating or responding to communications, or both. For example, the gamification system may identify a user with the Doer personality type. Accordingly, the recommendations generated for the user by the gamification system may include suggestion to take more time to draft important emails and include more polite statements to let others know they are respected (which may help to address problems commonly associated with the Doer personality type communications). The recommendations may further be designed to help the user develop interpersonal skills with people with other personality traits.

At step 432, the method 400 may include displaying the personality type recommendations to the user. In some embodiments, the results are displayed in a textual or graphical manner electronically, such as on a computer screen. In other embodiments, the gamification system may be a separate device that is equipped with a display component where the results may be displayed.

At step 434, the method 400 may include transmitting the personality type recommendations back to the gamification system. In another embodiment (not shown), actual communications resulting from the recommendations may be analyzed according to FIG. 3. In each case, these recommendations may be used in creating subsequent games, in giving subsequent communications recommendations, or both, and may improve the quality of the gamification system and communications recommendations, or both, over time in an iterative process. The personality type recommendations may also be used by a company to evaluate the performance and needs of its employees. In some embodiments, the gamification system includes a feedback function that allows a user to provide feedback on the usefulness of the personality type analysis or recommendations. This feedback may be incorporated in the game criteria of step 402 and the personality type criteria of step 404, for example. In an exemplary embodiment within the scope of the present disclosure, the method 400 repeats after step 434, such that method flow goes back to steps 402 and 404 and begins again.

FIG. 5 shows an exemplary interface of a gamification system according to aspects of the present disclosure. The gamification system may be the system discussed in reference to method 400 in FIG. 4. In some embodiments, the gamification system is integrated in a computer system. For example, the gamification system may include a computer or smart device application. The gamification system may include links to web pages or other applications. In other embodiments, the gamification system is a standalone device, such as handheld training device. This device may include a display component which may display an interface such as that shown in FIG. 5.

The interface of FIG. 5 includes a number of icons which may represent different functions of the gamification system. The shaded icons 502, 504, 506, 508, and 510 may represent the main functions or main menus of the gamification system, while the other icons may represent items related to the shaded icons 502 or submenus. Furthermore, the icons may represent separate pages or other areas where a user can read information or interact with the system. The Play icon 502 may represent a set of gaming functions such as those discussed in relation to the games and quizzes of FIG. 4. In particular, the Play icon 502 may include a games icon, a quizzes icon, and a statistics icon, which may provide links to the various functions. The statistics icon may provide access to statistics from games or quizzes taken by the user, such as a performance score or the amount of times each game has been played. The statistics may also include information on the performance of other users.

The Explore icon 504 may include information about various personality types and associated attributes. In some embodiments, the personality types of the gamification system represented in FIG. 5 include the Process Communication Model™, as well as other personality type models. The About Me icon 514 may include results from a diagnostic personality type test taken by a user, such as that discussed in method 400 of FIG. 4. The Overview icon 516 may give a user an overview of personality types and associated attributes. This overview may include personality type criteria as discussed in relation to step 310 of FIG. 3. Personality Type icons 518 may also be included beneath the Explore icon 504. In the example of FIG. 5, six Personality Type icons 518 are shown that correspond with the six personality types of the Process Communication Model™. In other embodiments, other designations of personality types or methods of classifying personality types may be used. Each of the six Personality Type icons 518 may be separately accessed on the interface of FIG. 5. The Personality Type icons 518 may include textual, graphical, and multi-media representations of each personality type.

The Connect icon 506 may be provide access to a company or organization. A user may use this icon to obtain contact information about a sponsoring company or report a problem. The Connect icon 506 may also provide information about the methods for analyzing communications or evaluating personality types.

The Apply icon 508 may provide a user with various interactive features. These may include a Personality Predictor icon 522, a Personality Based Email Assistant icon 524, a Communication Assistant icon 526, and a Mobile Training App icon 528. The Personality Predictor icon 522 may provide the user with diagnostic information in an effort to identify one or more personality types of the user. This diagnostic information may include an interactive game or series of questions such as those discussed in relation to steps 420, 422, 424, and 426 of FIG. 4.

The Personality Predictor icon 522 may also give the user suggestions on how to interact effectively with others having the same or different personality types. The Personality Based Email Assistant icon 524 may provide a system to assist a user in evaluating an email and sending an effective response. In some embodiments, an email may be submitted by the user to the gamification system where it is analyzed to determine personality type information. This information may be used to give recommendations to the user on how to reply to the email in an effective manner. The Communication Assistant icon 526 may assist a user in analyzing other types of communications besides email, such as phone calls, text messages, social media communication, and other web-based communications in an effort to communication effectively. The Mobile Training App icon 528 may provide access to interactive training features on an application configured for use on cellular phones and tablets. In some embodiments, the Mobile Training App icon 528 may provide access to similar games and quizzes as the interface of FIG. 5.

The Menu icon 510 may allow a user to invite others to the system, adjust setting, contact services for help, or logout of the gamification system.

It should be understood that the gamification system can be built into a standalone app that a user might play at any time to learn more about personality types.

In view of the present disclosure, it will be appreciated that various methods, devices, computer readable media, and systems have been described according to one or more embodiments for analyzing communications. The present disclosure may provide benefits over conventional systems, including providing communication recommendations for a variety of different types of recommendations, as well as providing interactive games to teach a user about personality types.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems including one or more memories storing various information described herein and one or more processors coupled to the one or more memories and a network, wherein the one or more processors are operable to perform steps as described herein, as non-transitory machine-readable medium including a plurality of machine-readable instructions which, when executed by one or more processors, are adapted to cause the one or more processors to perform a method including steps described herein, and methods performed by one or more devices, such as a hardware processor, user device, server, and other devices described herein.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to allow a quick determination of the nature of the technical disclosure. It is submitted with the understanding that it will not be used to interpret or limit the scope or meaning of the claims.

What is claimed is:

1. A method of teaching a user to facilitate communications, which comprises:
    receiving, by a communication link from a user device, a plurality of electronic communications, wherein the plurality of electronic communications comprise one or more of a phone call, an email, a text message, a social media post, a video interaction, a facsimile transmission, a web interaction, a chat, and a voice over IP;
    routing, by the communication link to one or more processors, the plurality of electronic communications;
    conducting, by the one or more processors, a linguistic analysis of the plurality of electronic communications, wherein the linguistic analysis comprises analysis of personality type criteria and linguistic factors obtained from mining data from the plurality of electronic communications, and wherein the analysis of the linguistic factors comprises a determination of whether certain words or phrases are present in the plurality of electronic communications by accessing a database storing the certain words or phrases;
    generating, by the one or more processors, a personality profile based on the personality type criteria and the linguistic factors for the contact;
    generating, by the one or more processors, recommendations to improve communications with the contact based on the personality profile of the contact;
    transmitting, by the one or more processors to a user device through a computer application, the generated recommendations;
    receiving, by the one or more processors from the user device, a draft communication;
    determining that the draft communication complies with the generated recommendations; and
    generating an influence score that predicts how the contact will respond to the draft communication.

2. The method of claim 1, wherein generating the recommendations further comprises identifying a personality type of the user.

3. The method of claim 1, wherein generating the recommendations further comprises providing an overview of a plurality of personality types.

4. The method of claim 1, wherein the user is a contact center agent.

5. The method of claim 1, further comprising providing a game or quiz based on personality type recognition.

6. The method of claim 1, wherein the linguistic analysis further comprises an analysis of a mood or stress level of the contact.

7. The method of claim 1, further comprising displaying the influence score on the user device.

8. A method of teaching a user to facilitate communications, which comprises:
    receiving, by a communication link from a user device, a plurality of electronic communications, wherein the plurality of electronic communications comprise one or more of a phone call, an email, a text message, a social media post, a video interaction, a facsimile transmission, a web interaction, a chat, and a voice over IP;
    routing, by the communication link to one or more processors, the plurality of electronic communications;
    conducting, by the one or more processors, a linguistic analysis of the plurality of electronic communications, wherein the linguistic analysis comprises analysis of personality type criteria and linguistic factors obtained from mining data from the plurality of electronic communications, and wherein the analysis of the linguistic factors comprises a determination of whether certain words or phrases are present in the plurality of electronic communications by accessing a database storing the certain words or phrases;
    providing the personality type criteria for a plurality of personality types;
    generating, by the one or more processors, a personality profile based on the personality type criteria and the linguistic factors for the contact;
    generating, by the one or more processors, recommendations to improve communications with the contact based on the personality profile of the contact;
    transmitting, by the one or more processors to a user device through a computer application, the generated recommendations;
    receiving, by the one or more processors from the user device, a draft communication;
    determining that the draft communication complies with the generated recommendations; and
    generating an influence score that predicts how the contact will respond to the draft communication.

9. The method of claim 8, wherein the linguistic analysis includes identifying a plurality of phrases associated with each of the plurality of personality types.

10. The method of claim 8, wherein generating the recommendations further comprises providing the user an overview of the plurality of personality types.

11. The method of claim 8, wherein the user is a contact center agent.

12. The method of claim 8, further comprising providing a game or quiz based on personality type recognition.

13. The method of claim 8, further comprising displaying the influence score on the user device.

* * * * *